United States Patent Office 3,394,713
Patented July 30, 1968

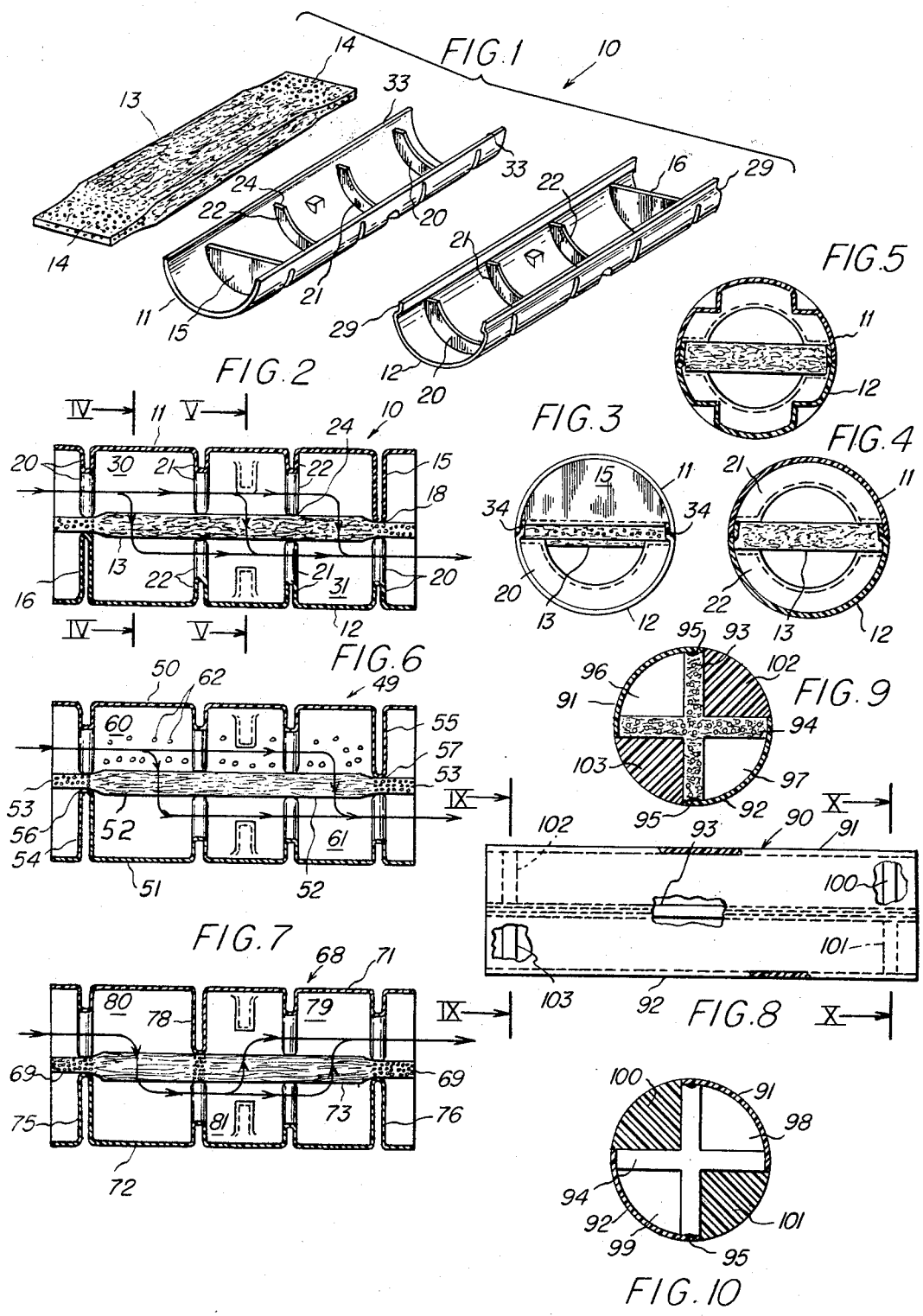

3,394,713
CIGARETTE FILTER
Richard N. Thomson, George E. Inskeep, and Albert P. Super, Richmond, Va., assignors to Philip Morris Incorporated, New York, N.Y., a corporation of Virginia
Filed Oct. 24, 1965, Ser. No. 504,796
4 Claims. (Cl. 131—264)

ABSTRACT OF THE DISCLOSURE

A cigarette filter which has a cylindrical body made of interfitting semi-cylindrical shell parts with a strip of filtering material extending axially through the body, the shell parts each having a transverse barrier adjacent one end, the shell part orientation being such that the barrier of one shell part is located at the opposite end of the body than that in the other shell part and at an opposite side of the filter strip. Thus smoke entering one end of the shell must do so at a location laterally displaced from that at which smoke exits the shell thereby ensuring that the smoke must make at least one passage through the filter strip.

---

This invention relates to a device for filtering tobacco smoke and is particularly concerned with a novel form of cigarette filter.

It is generally recognized that cigarette filters for removing harmful and deleterious particles and substances from the smoke the smoker inhales should possess certain characteristics to achieve economically and efficiently the intended purposes. Of prime consideration in the feature that the filtration material should effect a high level of absorption of undesirable substances, while it should not act to inhibit unduly the flow of smoke therethrough and particularly so as the filtration continues. It is also desirable that the filter unit be such that it can be readily manufactured in quantity on high speed automatic machinery in a continuous operation and at as low a cost as possible. Furthermore, the filter should possess sufficient inherent structural rigidity to withstand the repeated handling in automatic machinery to which cigarettes are subjected in the course of manufacture, and the abuses encountered at the hands of the smoker during smoking. At the same time, these characteristics should lend themselves to compatibility with the desirable features of compactness, lightness in weight and overall suitability for the intended purpose.

With the foregoing in mind, it is an important object of the present invention to provide a filter device which functions to achieve maximum filtration of all the smoke inhaled by the smoker, the latter preferably being effected by passing the smoke one or more times through a filter element having a larger outer face or surface area (as distinguished from the total surface area of the fibers or particles comprising the filter element) with the smoke passing through the filter element in a direction substantially perpendicular to normal axial flow. The accomplishment of the foregoing should be consistent with even filtration and a low drawing pressure which does not greatly increase during continued filtration.

Another object is to provide a filter device for a cigarette which includes a shell of fairly rigid construction, the shell being provided with reinforcing ribs formed integral therewith and having a plurality of integral barriers which act to divert the smoke in one or more courses through the filter element.

Another object is to provide a filter device wherein the filter strip through which the smoke is filtered has terminal sections which are specially impregnated with suitable material and which may thereafter be embossed so as to establish therein a means to prevent migration of tars and other liquid substances through the filter to the lips of the smoker during smoking and also to obviate axial flow of smoke through the filter element.

Other objects of the invention will in part be obvious and will in part appear hereinafter.

The filter of the present invention generally comprises a tubular shell conveniently made of two semi-cylindrical shell portions which interfit along their longitudinal margins to form the tubular structure, the semi-cylindrical sections being each provided with a transversely directed barrier at one end. The barriers are such that they extend only partly across the width of the shell assembly and are located at opposite ends thereof and on opposite sides of a filter element passing longitudinally through the cylinder, the filter element extending between the barriers and being fixedly engaged thereagainst. The foregoing arrangement provides that tobacco smoke must enter the filter at the tobacco end on one side of the filter strip and exit at the other side of the filter strip at the other or smoking end. In this manner all the smoke must make at least one pass through the filter strip. Means are provided for sealing together the longitudinal edges of the semi-cylindrical portions to maintain the shell in assembled condition and to prevent ingress of air during smoking. An important feature of the invention is that the filter strip is impregnated at each end with a suitable material and embossed to render it impervious both to the flow of tars, tobacco juices etc. (which normally migrate from the tobacco end to the smoking end of the filter during smoking), and to the passage of smoke axially through the filter strip.

The invention accordingly comprises an article of manufacture possessing the features, properties, and the relation of elements which will be exemplified in the article hereinafter described and the scope of the invention will be indicated in the claims.

For a fuller understanding of the nature and objects of the present invention reference should be had to the following detailed description when taken in conjunction with the accompanying drawings showing by way of example preferred embodiments of the inventive concept.

In the drawings:

FIGURE 1 is an exploded perspective view of the several component elements which comprise the filter of the present invention.

FIGURE 2 is a longitudinal sectional view of the assembled filter taken on a vertical cutting plane passing through the shell axis.

FIGURE 3 is an end elevational view of the assembled filter.

FIGURES 4 and 5 are sectional views of the assembled filter as taken along the lines IV—IV and V—V respectively, in FIGURE 2.

FIGURE 6 is a longitudinal central sectional view of a modified form of the filter wherein a quantity of a smoke treating substance is located in one of the filter chambers.

FIGURE 7 is a longitudinal central sectional view of a further embodiment of filter wherein the smoke undergoes at least two passes through the filter element during filtration.

FIGURE 8 is an elevational view of still another form of the filter employing a cruciform shaped filter element, some parts being broken away for purposes of clarity.

FIGURES 9 and 10 are sectional views as taken along the lines IX—IX and X—X respectively, in FIGURE 8.

Throughout the description like reference numerals are used to denote like parts in the drawings.

The filter of the present invention is described and illustrated by way of example as being a filter for use in cigarettes, although it should be understood that it is equally suited for use in filtering tobacco smoke in other smoking devices such as a pipe or cigar, and that it may be used in other devices for filtering gaseous media other than smoke. Referring now in detail to the filter embodiment shown in FIGURE 1, the filter 10 comprises a pair of semi-cylindrical shell portions 11 and 12 which when assembled, form a cylindrical or tubular shell. The shell may be made from a variety of materials, preferably resilient materials and in particular, a plastic material. As representative of a suitable material, a white polystyrene-butadiene copolymer having about a 17% rubber content was used for forming a shell having a thickness of about 0.010 inch and a length of 20 millimeters, the shell diameter corresponding generally to that of an average size cigarette. Other materials from which the shell may be made include cellulose acetate, cellulose acetate butyrate, polyethylene, nylon, methacrylate polymers, polypropylene, polyalomer, polyvinyl chloride, acrilonitrile butadiene styrene, impregnated and coated papers, thermosets (phenolics), metal foils, copolymers and blends thereof.

The filter also includes an elongated filter element 13 of generally flat strip shape, the strip being of substantially greater width than thickness, the strip having a width/thickness ratio of at least greater than 2:1, but preferably about 4:1. Sections at each end of the filter strip, i.e., adjacent both the smoking and tobacco ends, are preferably subjected during formation to an impregnation as at 14 with a suitable material, as for example, a hydrocarbon resin having a softening point in a range in excess of 150° F. Waxes including paraffins and microcrystallines may also be used as impregnants. The impregnated sections form in the filter element relatively dense end sections which are impervious to the passage of smoke, nicotine particles etc. thereby each constituting an "anti-wicking" zone. The impregnated sections also may be embossed as will be noted, resulting in a reduction in the thickness of the filter strip ends. The impregnated-embossed sections of filter strip 13 serves two important functions. First, the embossing prevents fraying of the edges of the filter strip when it is severed from a longer filter strip material roll to individual unit length suited for use in a cigarette filter assembly during manufacture, and two, the impregnant functions to eliminate the occurrence of "wicking" in the filter element. "Wicking" is generally understood in the art as meaning the migration during smoking, of tars and other distasteful particles from the tobacco end of a filter towards the smoking end. The significance of the "anti-wicking" function will become more apparent during the course of the description.

The semi-cylindrical shell portions 11 and 12 are generally similar in contour and construction. This similarity is most readily apparent from FIGURES 1 and 2 wherein it is seen that shell portions 11 and 12 have integrally formed, transversely directed barriers 15 and 16, respectively, at one end in the shape of a parti- or semicircular disc. Each shell portion also has a number of integral support ribs 20–22 extending inwardly, transversely from the outside of the shell, the support ribs being in the shape of segments of a hollow circular disc. It will be readily discernible by those skilled in the art that each semi-cylindrical shell portion is comprised of a number of aligned semi-cylindrical segments connected by the support ribs 20–22. The latter and the transverse barriers 15, 16 are conveniently formed by striking portions of the shell inwardly from the outside during manufacture, as for example, by utilizing a thermoforming method wherein a plastic strip is heated and pressure drawn over a suitable shaping or forming element. Other known continuous molding techniques also may be used for shaping the shell portions.

When the shell portions 11 and 12 are assembled, they are oppositely oriented with respect to the location of the transverse barriers. That is to say, the transverse barrier 15 of shell portion 11 is located at one side of a medial plane passing through the shell whereas, the barrier 16 in the shell portion 12 is located at the other side of the medial plane and the opposite end of the shell. As will be readily discerned, the filter element 13 is supported between the shell portions 11 and 12 being compressed or pinched between the flat edges of the barriers 15 and 16 and the respective support ribs 20. If desired, the filter element may also be fixedly secured to the barriers by means of an adhesive as at 18, to the flat edges 24 of the support ribs 20–22 and along its lateral edges to the inner surfaces of the shell portion 12. The filter element 13 serves as the aforementioned medial plane and defines with the outside of the respective shell portions, first and second chambers 30, 31 in the shell. As seen in FIGURE 2, the provision of these separate chambers in the shell provides that smoke entering the filter at the tobacco end must pass through the filter element 13 in a direction perpendicular to its normal axial flow, and enter chamber 31 before exiting at the smoking end. This arrangement thus insures that all smoke inhaled by the smoker will undergo at least one pass through the filter element, the path being generally denoted by the arrows in FIGURE 2. It will be noted that the resin impregnated section 14 at the left end of the filter element 13 prevents the smoke from entering therein axially and diverts smoke impinging thereon into chamber 30. The resin impregnated section 14, as was previously mentioned, may be embossed. The impregnated section 14 at the left side also prevents tobacco juices, tars, etc. from entering the filter element at the tobacco end. As a further protection, the impregnated section 14 at the right side will act to bar any "wicking" effect that may occur in the filter from conveying these distasteful substances to the smoker's lips.

As seen in FIGURES 2 and 3, the shell portions 11 and 12 are adapted to interfit along their longitudinal margins to form a tubular shell enclosure housing the filter element 13. To facilitate the latter particularly in view of the high speed at which the shell portions are assembled on the automatic forming machinery, and to insure a proper mating of the shell portions, shell portion 12 is provided with slightly inwardly crimped longitudinal margins as at 29. The longitudinal margins of shell portion 12 thus constitute a male joint means. On the other hand, the spacing between the longitudinal margins 33 of shell portion 11 is slightly greater than the distance between the outside surfaces of the margins on shell portion 12, and they thus constitute a female joint means for receiving the male joint means as best seen in FIGURE 3. The joint may be secured by applying an adhesive 34 to the inner faces of the female joint means prior to assembling the shell portions. Suitable adhesives may include hot melt waxes, solvents and other known sealant materials adopted to accomplish the intended result. In general, however, the adhesive or sealant should not be of a type that would adhere to and accumulate upon the forming machinery.

When the shell portions are then assembled, the male joint means will become adhesively secured thereto with the adhesive also functioning as a joint sealing layer. The sealing layer acts to prohibit the random passage of smoke laterally out of the filter and prevents inward aspiration of air when the smoker inhales. Other sealing means which could be employed for connecting the shell portions include ultrasonic heat seal or fusion of the shell material at the male and female joint means.

Filter element 13 may be made of various materials including cellulose, felt organic microfibers or similar porous materials. The filter element material preferably should have a porosity of 3–8 seconds (determined by ASTM method D726–58 as modified by using 50 ounce cylinder with results obtained from 300 cc. in lieu of conversion to 100 cc.) a thickness of between 60–90 mils and a density of about 0.2–0.4 gm./cc. As was previously mentioned, the filter element is supported axially in the shell on the flat surfaces of the support ribs 20–22 and the barriers 15, 16. Furthermore, the adhesive mentioned before may also be used to secure the longitudinal edges of the filter strip to the inside surfaces of the male joint means. It is also possible to provide that the filter strip may have a length slightly less than that of the shell to produce a recessing of the filter element at the smoking end.

FIGURE 6 illustrates a modified form of filter 49 which comprises the shell portions 50 and 51, and a filter strip 52 supported between the assembled shell portions and having at each end a resin impregnated, embossed section as at 53, the filter strip being fixedly connected to the barriers 54 and 55 as at 56 and 57 respectively. Tobacco smoke is intended to enter at the left end of the filter and follow the path denoted by the arrows, being drawn into chamber 60 in the shell wherein is located a smoke treating substance in the form of either a quantity of a granular filtration material 62, as for example, charcoal particles, or a flavoring substance such as a mentholated composition or both. The smoke then passes through the filter element 52 and into chamber 61 and on out of the smoking end.

In both of the filter embodiments illustrated in FIGURES 1 and 6, the tobacco smoke is intended to undergo one passage through the filter element and to that end, it enters one end of the shell to one side of the filter strip, is drawn through the filter in a direction perpendicular to normal axial flow, and exits from the shell at the other side of the filter strip. In other words, the smoke exits at a laterally displaced location from that of first entry. On the other hand, the filter shown in FIGURE 7 is intended to provide a double passage of smoke through the filter. Thus filter 68 includes a shell comprised of shell poritons 71 and 72 and a strip filter element 73 supported axially therein. The shell portion 72 is provided with integral smoke barriers at each end as at 75 and 76 which extend transversely inwardly from the outside of the shell and to which are fixedly engaged against the ends of the filter strip. On the other hand, the shell portion 71 is provided with a single integral smoke barrier 78 which may be located at one of a number of locations intermediate the ends of the shell portion and which is fixedly connected to the other side of the filter strip as shown. This arrangement of barriers it will be noted defines with the filter strip, three chambers, 79, 80 and 81 within the shell. The two chambers 79 and 80 are defined by the shell portion 71 and one side of the filter strip and the remaining chamber 81 by the shell portion 72 and the other side of the filter strip. The tobacco smoke thus must enter the chamber 80 at the left end of the filter and be drawn in the direction indicated by the arrows through a first passage of the filter strip into chamber 81, and thereafter make a second passage through the filter strip into chamber 79 before exiting at the right or smoking end of the filter. The advantage of this construction obviously is that the chamber 81 is fully closed at each end to facilitate retention therein of a smoke treating substance (not shown). In this arrangement, the smoke makes two complete passages through the filter strip 73. The filter element in filter 68 also may be impregnated with resin and embossed at each end as at 69 in the manner and for the purposes previously described, as well as being impregnated in the region adjacent smoke barrier 78 as at 85.

A further modified form of the filter of the present invention is shown in FIGURES 8, 9 and 10. In this form, the filter includes a shell 90 comprised of upper and lower semi-cylindrical shell portions 91 and 92 which interfit to form a tubular shell in the same manner as previously described. Supported within the shell 90 is an elongated filter element 93 of cruciform shape. The filter element 93 may be impregnated with a resin and embossed at each end as at 94 to prevent migration of tars etc. from the tobacco end of the filter towards the smoking end and eventually to the smoker's lips during smoking. The filter element is fixedly connected to the end of the shell with adhesive as at 95, and along the outer peripheries of the cruciform branches by a suitable adhesive similar to that used for connecting together the shell portions. The branches of the cruciform filter element 93 define with the shell a plurality of chambers within the shell. In this case, the chambers are four in number, 96, 97, 98 and 99. Smoke barriers 100, 101, 102 and 103 are associated with each of the chambers each being fixedly secured to the corresponding faces of the filter element branches. At the smoking end, the barriers 100 and 101 are associated respectively with the chambers 96 and 97, being arranged in diametrically opposed locations. On the other hand, the barriers 102 and 103 at the tobacco end of the filter and which are located in chambers 98 and 99, respectively, are oppositely oriented so that smoke entering from the tobacco end through chambers 96 and 97 must in order to exit from the smoking end, pass through at least one filter branch to gain access to a chamber 98 or 99 which is in communication with the outside at the smoking end.

From the foregoing description it will be seen that the filter of the present invention has a number of advantages over prior art filters. In particular, it utilizes a filter element of relatively large outer face or surface area and extending axially of the normal direction of smoke travel so that the smoke must pass therethrough in a direction perpendicular to axial flow enabling this passage to be effected through the large filter area in the most effective manner. The foregoing is particularly important in that it reduces the channeling of smoke during filtration through portions of a filter that have already accumulated large quantities of tars etc. Another important feature is that the filter has end portions which are impregnated with a suitable material to prevent migration of tars and other distasteful liquid smoke materials through the filter strip and ultimately to a point where they might easily come in contact with the smoker's lips and tongue.

Of particular importance is the fact that the filter of the present invention is susceptible to manufacture in one piece semi-cylindrical sections each formed with the necessary barriers and supporting ribs formed integrally therein.

It will thus be seen that the objects set forth above, among those made apparent from the preceding description are efficiently attained and, since certain changes may be made in the above article and different embodiments of the invention could be made without departing from the scope thereof, it is intended that all matter contained herein shall be interpreted as illustrative and not in a limiting sense.

What is claimed is:

1. In a device for filtering tobacco smoke, a tubular shell, a filter element extending axially within said shell defining first and second chambers therein, a smoke barrier in said first chamber comprising a parti-circular disc extending transversely of said shell at one end thereof, and a smoke barrier in said second chamber comprising a parti-circular disc extending transversely of said shell at the other end thereof, each of said smoke barriers being fixedly engaged with said filter element, at least one end section of said filter element containing therewithin a material impervious to the passage of smoke and tobacco particles.

2. In a device for filtering tobacco smoke, a shell comprising a pair of interfitting semi-cylindrical shell portions, an elongated filter strip extending axially within said shell defining first and second chambers therein, a smoke barrier in said first chamber comprising a parti-circular disc integral with the corresponding shell portion and extending transversely thereof at one end of said shell, and a smoke barrier in said second chamber comprising a parti-circular disc integral with the corresponding shell portion and extending transversely thereof at the other end of said shell, each of said smoke barriers being fixedly engaged with the corresponding end of said filter strip, at least one end section of said filter strip containing therewithin a material impervious to the passage of smoke and tobacco particles.

3. A filter in accordance with claim 2 wherein the longitudinal margins of one of said semi-cylindrical shell portions are crimped inwardly to form a male joint means, the longitudinal margins of the other of said semi-cylindrical shell portions defining a female joint means receiving said male joint means.

4. A filter in accordance with claim 2 wherein said semi-cylindrical shell portions are joined together along the respective longitudinal margins by means of an adhesive, said adhesive sealing said joint to prevent the ingress of air to the filter during smoking.

References Cited

UNITED STATES PATENTS

| | | | |
|---|---|---|---|
| 1,554,353 | 9/1925 | Johnson | 131—207 X |
| 1,619,387 | 3/1927 | Waugh | 131—264 |
| 1,620,438 | 3/1927 | Bushee | 131—210 |
| 2,100,988 | 11/1937 | Tanner | 131—210 |
| 2,126,545 | 8/1938 | Field | 131—210 |
| 3,062,220 | 11/1962 | Brothers | 131—10.5 X |

FOREIGN PATENTS 296,256  8/1928  Great Britain.

JOSEPH S. REICH, *Primary Examiner.*